US012676555B2

(12) United States Patent
Wei et al.

(10) Patent No.: US 12,676,555 B2
(45) Date of Patent: Jul. 7, 2026

(54) DUAL ACTIVE BRIDGE CONTROL TO MINIMIZE DC LINK RESONANCE

(71) Applicant: Rivian IP Holdings, LLC, Irvine, CA (US)

(72) Inventors: Lixiang Wei, Irvine, CA (US); Chunhui Liu, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 190 days.

(21) Appl. No.: 18/524,115

(22) Filed: Nov. 30, 2023

(65) Prior Publication Data

US 2025/0183807 A1 Jun. 5, 2025

(51) Int. Cl.
*H02M 3/335* (2006.01)
*H02M 3/00* (2006.01)
(52) U.S. Cl.
CPC ........... *H02M 3/3353* (2013.01); *H02M 3/01* (2021.05)
(58) Field of Classification Search
CPC .. H02M 3/33573; H02M 3/3353; H02M 3/01; H02M 3/33584; H02M 1/346; H02M 1/15
See application file for complete search history.

(56) References Cited

U.S. PATENT DOCUMENTS

| | | | | |
|---|---|---|---|---|
| 6,483,723 B2 * | 11/2002 | Kuranuki | ................ | H02M 1/34 363/17 |
| 2002/0075698 A1 * | 6/2002 | Kuranuki | ................ | H02M 1/34 363/17 |
| 2018/0331625 A1 * | 11/2018 | Somani | ................... | H02M 1/08 |

FOREIGN PATENT DOCUMENTS

| | | | | |
|---|---|---|---|---|
| CN | 110401350 A | * 11/2019 | ......... | H02M 3/3353 |
| CN | 114696625 A | * 7/2022 | ........ | H02M 3/33584 |

OTHER PUBLICATIONS

Machine Translation CN-114696625-A (Year: 2022).*
Machine Translation CN-110401350-A (Year: 2019).*
Zhao, B., et al., "Overview of Dual-Active-Bridge Isolated Bidirectional DC-DC Converter for High-Frequency-Link Power-Conversion System", IEEE Transactions on Power Electronics, vol. 29, No. 8, Aug. 2014, pp. 4091-4106.

* cited by examiner

*Primary Examiner* — Thienvu V Tran
*Assistant Examiner* — Yahveh Comas Torres
(74) *Attorney, Agent, or Firm* — HG LAW LLP

(57) ABSTRACT

Systems and methods for operating dual active bridge (DAB) converters are provided herein. The systems and methods include sending a first control signal to toggle a first pair of switches of a bridge of the DAB converter and sending a second control signal to toggle a second pair of switches of the bridge, where a temporal delay, based on a resonance time for the bridge, separates the toggling caused by the first control signal from the toggling caused by the second control signal.

20 Claims, 6 Drawing Sheets

600

606

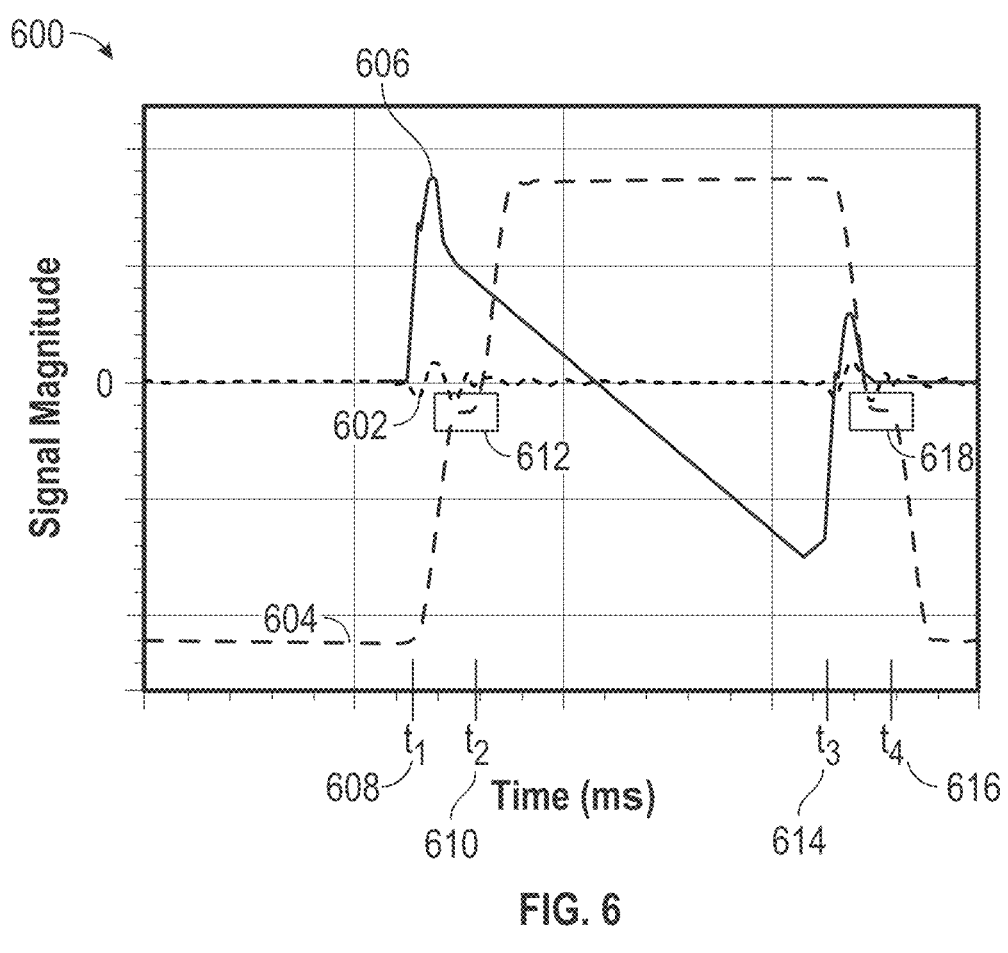

Signal Magnitude

0

606

602

612

618

604

608 t₁  t₂  Time (ms)  t₃  t₄  616

702
Send a first control signal to toggle a first pair of switches of a bridge of a Dual Active Bridge (DAB) converter 704
Send a second control signal to toggle a second pair of switches of the bridge, wherein a temporal delay separates the toggling caused by the first control signal from the toggling caused by the second control signal, and the temporal delay is based on a resonance time for the bridge

FIG. 7

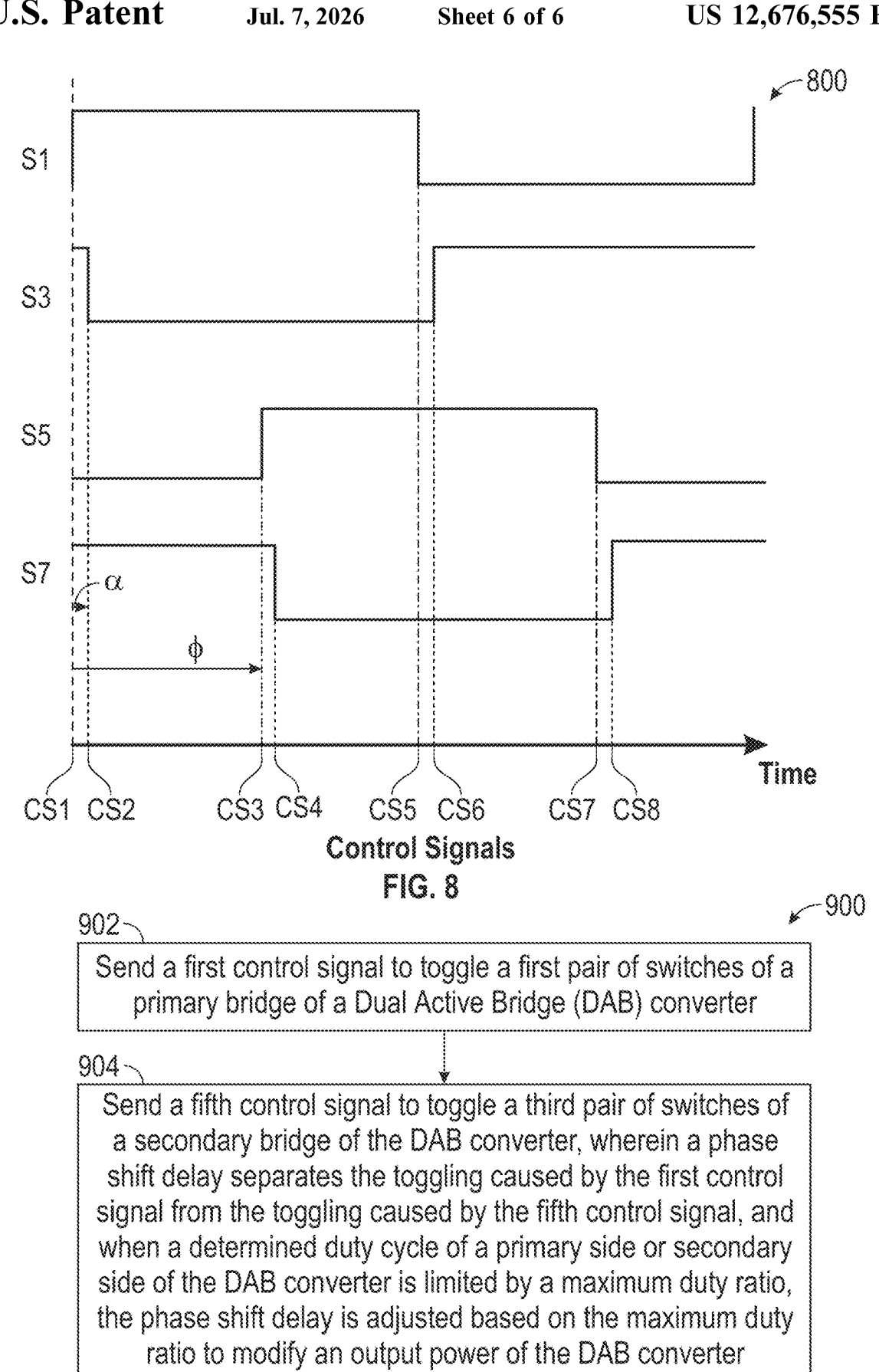

Control Signals

Send a first control signal to toggle a first pair of switches of a primary bridge of a Dual Active Bridge (DAB) converter

904 —

Send a fifth control signal to toggle a third pair of switches of a secondary bridge of the DAB converter, wherein a phase shift delay separates the toggling caused by the first control signal from the toggling caused by the fifth control signal, and when a determined duty cycle of a primary side or secondary side of the DAB converter is limited by a maximum duty ratio, the phase shift delay is adjusted based on the maximum duty ratio to modify an output power of the DAB converter

FIG. 9

DUAL ACTIVE BRIDGE CONTROL TO MINIMIZE DC LINK RESONANCE

The present disclosure is directed to power electronics equipment for providing power to a load. More specifically, the present disclosure is directed to systems and methods for operating dual active bridge (DAB) power converters that minimize DC link power resonance occurring across components coupled to the DAB converter.

SUMMARY

A dual active bridge (DAB) converter is a type of power electronics equipment that may be used for DC to DC power conversion. In some embodiments, operating a DAB converter induces resonant power (e.g., ripple currents) across one or more components linked to the DAB converter, including, for example, snubber capacitors.

The operation of DAB converters at or near maximum power may be limited by power and/or heat accumulation at components including snubber capacitors. Such components may be at risk of earlier failure due to this energy accumulation. In some embodiments, the energy accumulation may be solved by increasing the size of components including snubber capacitors. However, such size increases may be costly or require increased sizing of packaging enclosing the DAB converter. Therefore, in accordance with some embodiments of the present disclosure, a control method is provided for reducing DC link resonance, including minimizing the ripple current on snubber capacitors, without appreciably reducing the power output of the DAB converter.

In accordance with some embodiments of the present disclosure, a method includes sending a first control signal to toggle a first pair of switches of a bridge of a dual active bridge (DAB) converter and sending a second control signal to toggle a second pair of switches of the bridge, where a temporal delay separates the toggling caused by the first control signal from the toggling caused by the second control signal, and the temporal delay is based on a resonance time for the bridge.

In some embodiments, the resonance time for the bridge is based on a capacitance of at least two capacitors coupled to the bridge and an inductance between the at least two capacitors coupled to the bridge, and the temporal delay corresponds to half of the resonance time.

In some embodiments, the method also includes sending third and fourth control signals to respectively toggle the first and second pairs of switches of the bridge, where the temporal delay separates the toggling caused by the third control signal from the toggling caused by the fourth control signal, a duty cycle interval separates the toggling caused by the first and third control signals, the duty cycle interval separates the toggling caused by the second and fourth control signals, and the duty cycle interval is based on a maximum duty ratio for the first and second pairs of switches of the bridge and a sampling time of the DAB converter.

In some embodiments, the maximum duty ratio is 0.5* $(T_s-T_{res})/T_s$, where $T_s$ is the sampling time of the DAB converter and $T_{res}$ is the resonance time for the primary bridge of the DAB converter.

In some embodiments, the maximum duty ratio is 0.5* $(T_s-n*T_{res})/T_s$, where $T_s$ is the sampling time of the DAB converter, $T_{res}$ is the resonance time for the bridge of the DAB converter, and n is an odd scalar of the resonance time.

In some embodiments, the bridge is a primary bridge of the DAB converter and the temporal delay is a first temporal delay. The method also includes sending a fifth control signal to toggle a third pair of switches of a secondary bridge of the DAB converter, and sending a sixth control signal to toggle a fourth pair of switches of the secondary bridge, where a second temporal delay separates the toggling caused by the fifth control signal from the toggling caused by the sixth control signal, and the second temporal delay is based on a resonance time for the secondary bridge.

In some embodiments, the method also includes sending seventh and eighth control signals to respectively toggle the third and fourth pairs of switches of the secondary bridge, where the second temporal delay separates the toggling caused by the seventh control signal from the toggling caused by the eighth control signal, a duty cycle interval separates the toggling caused by the fifth and seventh control signals, the duty cycle interval separates the toggling caused by the sixth and eighth control signals, and the duty cycle interval is based on a maximum duty ratio for the third and fourth pairs of switches of the bridge and a sampling time of the DAB converter.

In some embodiments, the toggling caused by the first control signal and the toggling caused by the fifth control signal are separated by a phase shift delay.

In some embodiments, when a determined duty cycle of a primary side or secondary side of the DAB converter is limited by a maximum duty ratio, the phase shift delay is adjusted based on the maximum duty ratio to modify an output power of the DAB converter.

In accordance with some embodiments of the present disclosure, a method includes sending a first control signal to toggle a first pair of switches of a primary bridge of a dual active bridge (DAB) converter, and sending a fifth control signal to toggle a third pair of switches of a secondary bridge of the DAB converter, where a phase shift delay separates the toggling caused by the first control signal from the toggling caused by the fifth control signal, and when a determined duty cycle of a primary side or secondary side of the DAB converter is limited by a maximum duty ratio, the phase shift delay is adjusted based on the maximum duty ratio to modify an output power of the DAB converter.

In some embodiments, the method also includes sending a second control signal to toggle a second pair of switches of the primary bridge, where a temporal delay separates the toggling caused by the first control signal from the toggling caused by the second control signal, and the temporal delay is based on a resonance time of the primary bridge.

In accordance with some embodiments of the present disclosure, a system includes first and second pairs of switches coupled to a bridge of a dual active bridge (DAB) converter, and control circuitry coupled to the first and second pairs of switches and configured to send a first control signal to toggle the first pair of switches, and send a second control signal to toggle the second pair of switches, where a temporal delay separates the toggling caused by the first control signal from the toggling caused by the second control signal, and the temporal delay is based on a resonance time for the bridge.

In some embodiments, the system also includes at least two capacitors coupled to the bridge, where the resonance time for the bridge is based on a capacitance of the at least two capacitors and an inductance between the at least two capacitors, and the temporal delay corresponds to half of the resonance time.

In some embodiments, the control circuitry is also configured to send third and fourth control signals to respectively toggle the first and second pairs of switches of the bridge, where the temporal delay separates the toggling caused by the third control signal from the toggling caused by the fourth control signal, a duty cycle interval separates the toggling caused by the first and third control signals, the duty cycle interval separates the toggling caused by the second and fourth control signals, and the duty cycle interval is based on a maximum duty ratio for the first and second pairs of switches of the bridge and a sampling time of the DAB converter.

In some embodiments, the maximum duty ratio is 0.5* $(T_s-T_{res})/T_s$, where $T_s$ is the sampling time of the DAB converter and $T_{res}$ is the resonance time for the primary bridge of the DAB converter.

In some embodiments, the maximum duty ratio is 0.5* $(T_s-n*T_{res})/T_s$, where $T_s$ is the sampling time of the DAB converter, $T_{res}$ is the resonance time for the bridge of the DAB converter, and n is an odd scalar of the resonance time.

In some embodiments, the bridge is a primary bridge of the DAB converter. The system also includes third and fourth pairs of switches coupled to a secondary bridge of the DAB converter, and the temporal delay is a first temporal delay, and where the control circuitry is also configured to send a fifth control signal to toggle a third pair of switches of the secondary bridge of the DAB converter, and send a sixth control signal to toggle a fourth pair of switches of the secondary bridge, where a second temporal delay separates the toggling caused by the fifth control signal from the toggling caused by the sixth control signal, and the second temporal delay is based on a resonance time for the secondary bridge.

In some embodiments, the control circuitry is also configured to send seventh and eighth control signals to respectively toggle the third and fourth pairs of switches of the secondary bridge, where the second temporal delay separates the toggling caused by the seventh control signal from the toggling caused by the eighth control signal, a duty cycle interval separates the toggling caused by the fifth and seventh control signals, the duty cycle interval separates the toggling caused by the sixth and eighth control signals, and the duty cycle interval is based on a maximum duty ratio for the third and fourth pairs of switches of the bridge and a sampling time of the DAB converter.

In some embodiments, the toggling caused by the first control signal and the toggling caused by the fifth control signal are separated by a phase shift delay. In some embodiments, when a determined duty cycle of a primary side or secondary side of the DAB converter is limited by a maximum duty ratio, the phase shift delay is adjusted based on the maximum duty ratio to modify an output power of the DAB converter.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

4

Figure 2:
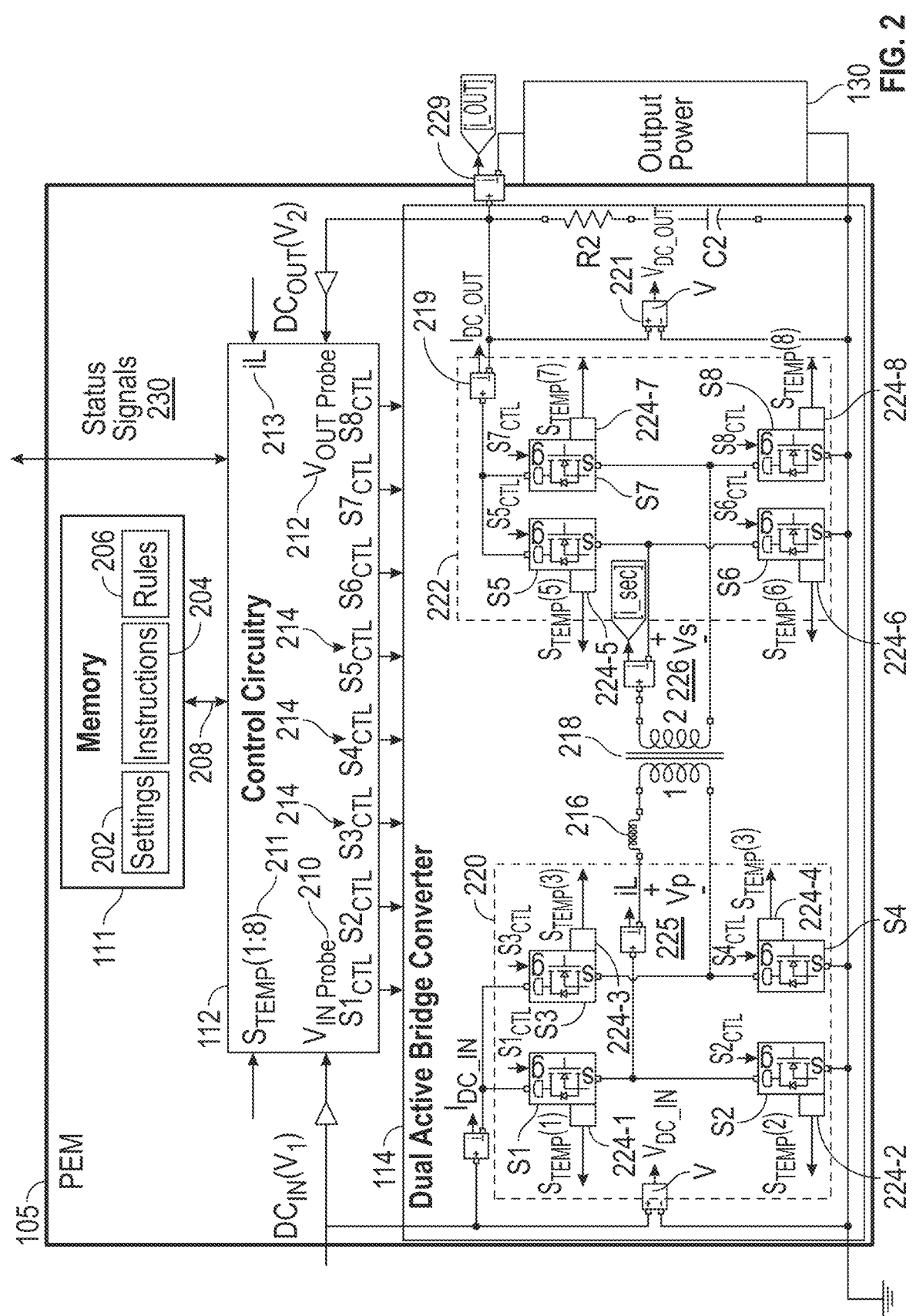
Figure 3:
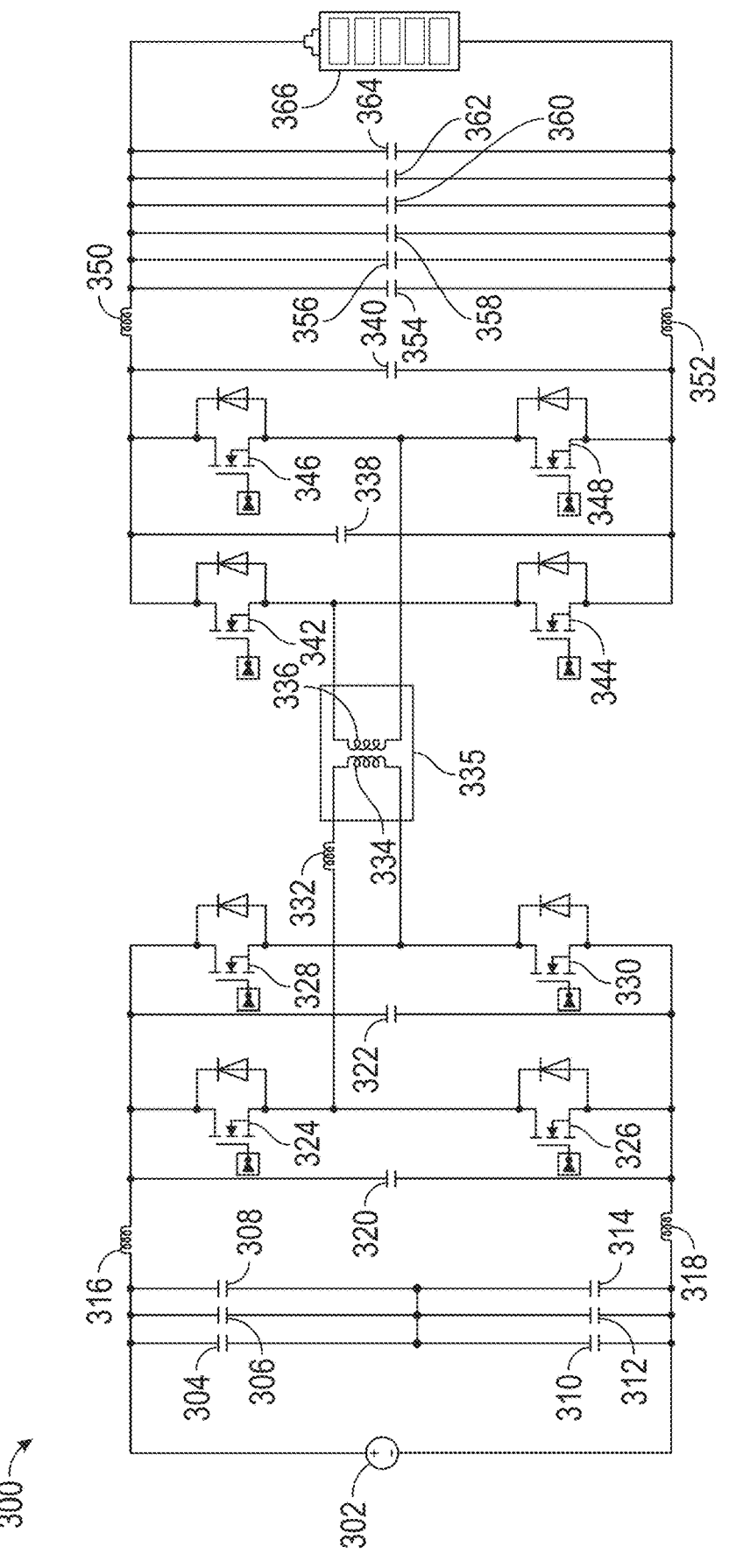
Figure 4:
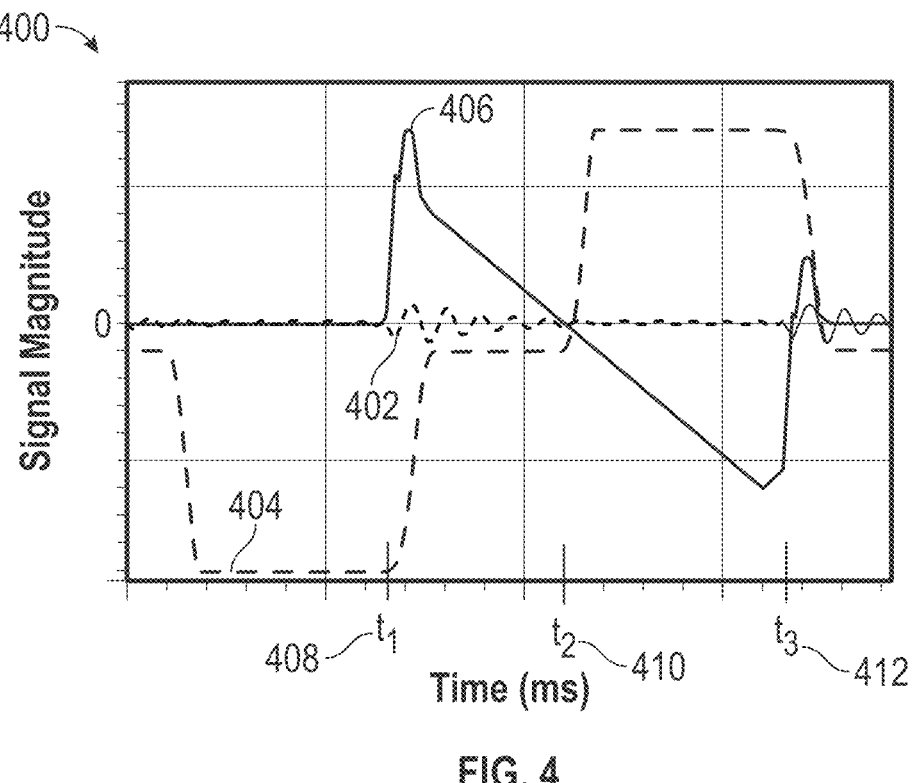
Figure 5:
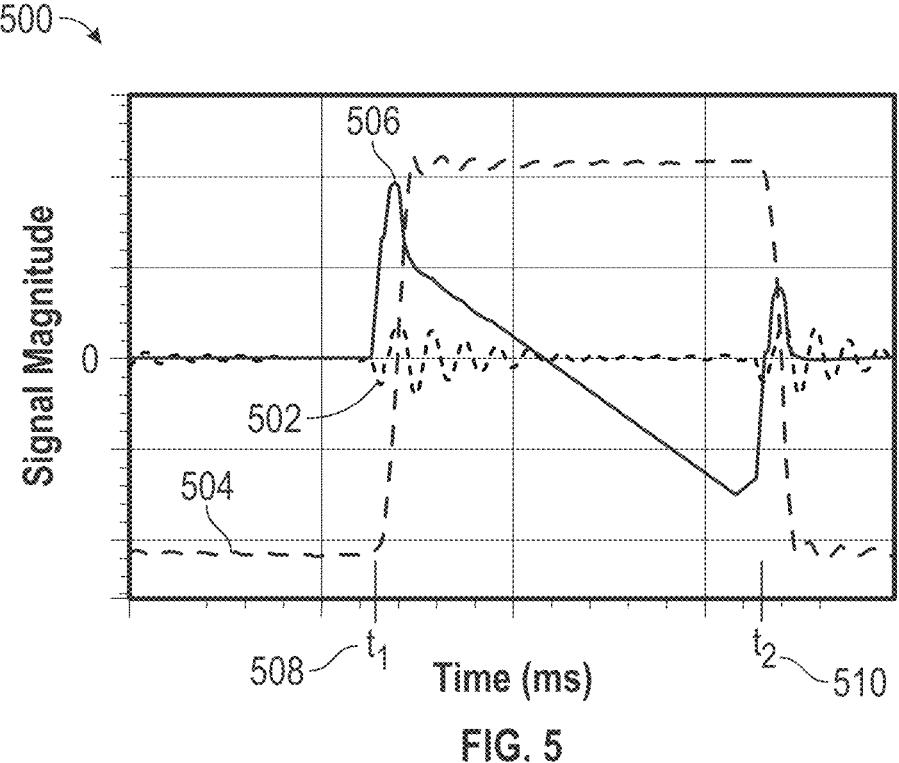

FIG. 2 is an illustrative block diagram showing additional details of some components of power electronics equipment, in accordance with some embodiments of the present disclosure;

FIG. 3 is an illustrative circuit schematic of a dual active bridge (DAB) converter, in accordance with some embodiments of the present disclosure;

FIG. 4 is an illustrative depiction of power flows during a first switching scheme of a DAB converter, in accordance with some embodiments of the present disclosure;

FIG. 5 is an illustrative depiction of power flows during a second switching scheme of a DAB converter, in accordance with some embodiments of the present disclosure;

FIG. 6 is an illustrative depiction of power flows during a third switching scheme of a DAB converter, in accordance with some embodiments of the present disclosure;

FIG. 7 is an illustrative flowchart of a first method for controlling switches of a DAB converter, in accordance with some embodiments of the present disclosure;

FIG. 8 is an illustrative switch timing diagram including a short temporal delay; and FIG. 9 is an illustrative flowchart of a second method for controlling switches of a DAB converter, in accordance with some embodiments of the present disclosure.

DETAILED DESCRIPTION

Power electronics equipment may be used to provide power to a load. For example, a dual active bridge (DAB) converter is a type of power electronics equipment that may be used to transfer power from an energy source to battery (e.g., in an electric vehicle). In such an implementation, a DAB converter may be desirable to use based on its ability to transfer a wide range of power to the battery (e.g., to accommodate a wide range of intended charging rates). In particular, transferring high levels of power (e.g., corresponding to a maximum or near-maximum rating of the DAB converter) may result in high levels of energy (e.g., electrical power and/or heat) being transferred to electronic components other than the battery. For example, electronic components with resonant DC links to the DAB converter may be exposed to resonant DC power flows during operation of the DAB converter.

In some embodiments, "snubber capacitors" may be coupled to the DAB converter to absorb such high levels of resonant energy and prevent power electronics components from overheating, blowing out, or otherwise failing. Therefore, snubber capacitors may be important elements of a power electronics system including a DAB converter. While it is possible to use large or oversized snubber capacitors to absorb sufficient levels of energy and protect the corresponding power electronics system, such large capacitors may be otherwise undesirable due to their large size, high cost, and/or other constraints. Thus, it may be desirable to use other techniques to protect components of the power electronics system, such as control methods for minimizing the magnitude of resonant power flows into electronic components linked to the DAB converter.

In accordance with some embodiments of the present disclosure, DAB converter systems and control methods are provided for minimizing DC power resonance across electronic components linked to the DAB converter. For example, control methods are provided for minimizing DC power resonance across one or more snubber capacitors coupled across a bridge of a transformer of the DAB converter.

The operation of a DAB converter may include sending control signals to toggle (e.g., open or close an electrical connection) various switches that may control power flows through primary and secondary bridges of a transformer of the DAB converter. A timing sequence associated with the toggling may be determined based on an intended magnitude of power to be delivered by the DAB converter. Moreover, the act of toggling may induce ripple currents across the snubber capacitors coupled to the primary and secondary sides, such that the intended magnitude of power to be delivered by the DAB converter may determine the magnitude of ripple currents occurring at the snubber capacitors. As used herein, a "ripple" current may refer to an oscillatory current with a temporally-decaying magnitude that occurs in response to the toggling of one or more switching elements.

When each bridge of the DAB converter is coupled to two pairs (or "legs") of coordinated switches, maximizing the power output of the DAB converter may require simultaneously toggling both legs of at least one bridge of the converter. In response to such simultaneous leg toggling, a greater ripple current magnitude may be induced on one or more snubber capacitor as compared to the case of discrete toggling of each leg.

The control methods and corresponding systems provided herein minimize these ripple current magnitudes across snubber capacitors without sacrificing appreciable capacity of the maximum DAB converter power output. In particular, it is observed that near-simultaneous switching of two legs can be controlled in a manner that minimizes the snubber capacitor ripple current magnitude. Specifically, a short temporal delay based on a resonance time of a bridge of the DAB converter may be applied between toggling first and second legs of the bridge. In some embodiments, the short temporal delay is less than 1% 2%, 3%, 4%, 5%, 6%, 7%, 8%, 9%, or 10% of the duty cycle. Based on the short temporal delay, ripple currents resulting from the toggling of the first leg may be cancelled out by ripple currents resulting from the toggling of the second leg.

While this short temporal delay may necessarily cause a small reduction in the maximum power output, some embodiments provided herein compensate for this small power output reduction to preserve near-maximum power output performance. In particular, the temporal delay may reduce the maximum duty ratios of the DAB converter bridges to below 0.5. In some embodiments, this small reduction in power may be compensated for by modifying a phase shift delay between operation of the primary and secondary bridges of the DAB converter. For example, the phase shift delay may be based on the difference between the standard duty ratio (e.g., 0.5) and the maximum duty ratio (e.g., 0.48) considering the temporal delay.

Accordingly, as described above and as further described in detail below, control methods and corresponding systems are provided for operating DAB converters with reduced ripple current on snubber capacitors and without sacrificing appreciable power output.

Figure 1:
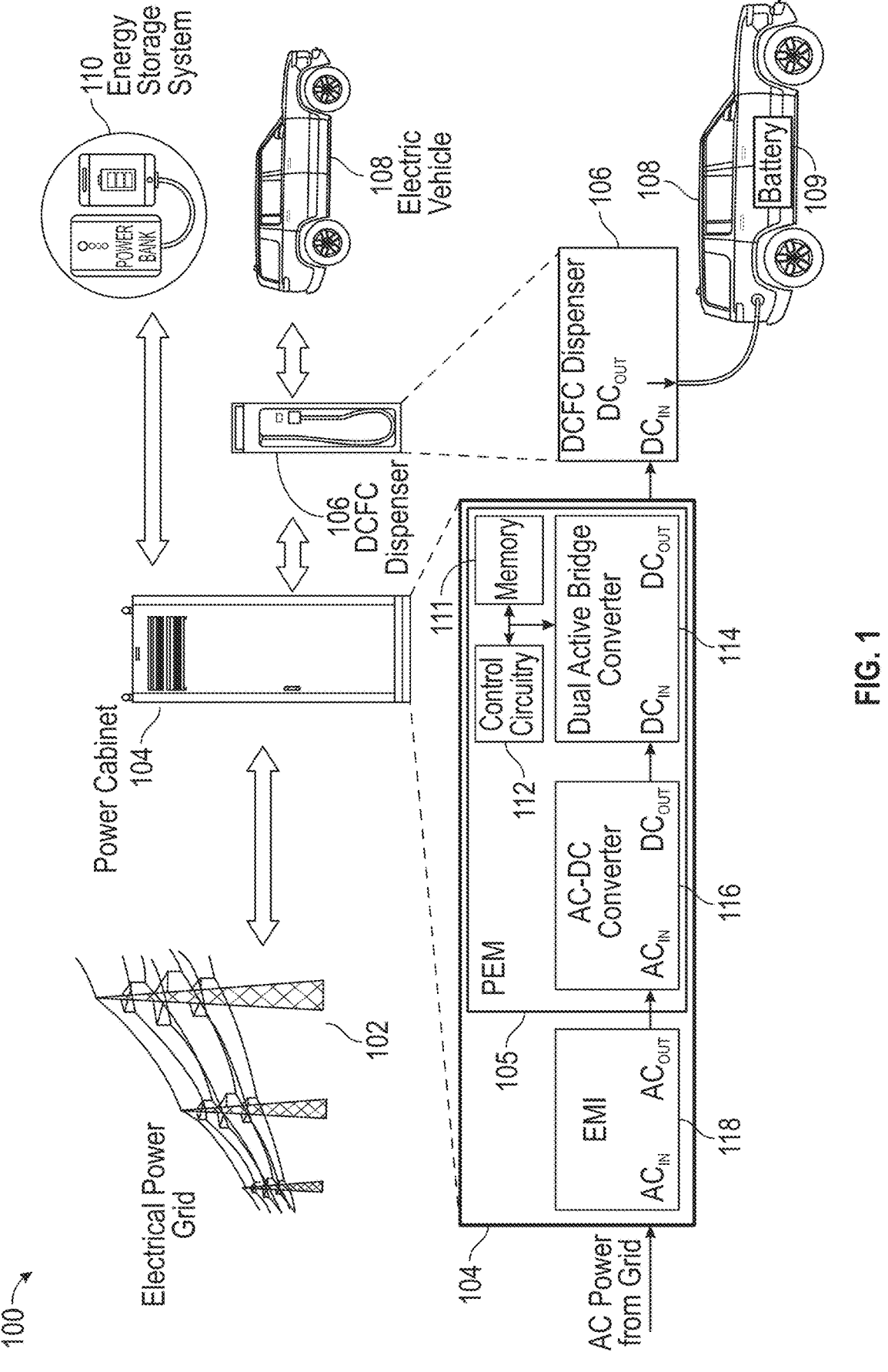
FIG. 1 shows an illustrative block diagram of an electric vehicle charging system including power electronics equipment for providing power to a load and/or an energy storage system, in accordance with some embodiments of the present disclosure.

FIG. 1 depicts an illustrative block diagram 100 of an electric vehicle charging system including a DAB converter for providing power to a load and/or an ESS, in accordance with some embodiments of the present disclosure. Power is input to the system by electrical power grid 102, which is coupled to power cabinet 104. Power cabinet 104 is coupled to direct current fast charge (DCFC) dispenser 106. Through a direct connection or through dispenser 106, power cabinet 104 ultimately delivers power to at least one of electric vehicle 108 (specifically battery 109 therein) and/or energy storage system (ESS) 110. Power cabinet 104 includes one or more power electronics module (PEM) 105, each of which includes DAB converter 114 as well as memory 111 and control circuitry 112, where memory 111 may include instructions for operating control circuitry 112 to control DAB converter 114 according to the operations described above and as further described below. In some embodiments, DAB converter 114 is electrically isolated from other components of block diagram 100 and is configured for bidirectional flow (e.g., DAB converter 114 can either send power to or receive power from DCFC dispenser 106 or ESS 110). Embodiments of the present disclosure may serve either direction of power flow through DAB converter 114. Additionally included in PEM 105 is AC to DC converter 116, which may convert incoming AC power from the electric grid to a first DC power that can then be converted into a second DC power (e.g., by DAB converter 114) for powering connected loads. In some embodiments, AC to DC converter 116 may convert incoming DC power (e.g., from electric vehicle 108 or ESS 110, through DAB converter 114) to AC power that may be supplied to the electric grid (e.g., to provide grid support) or AC loads (e.g., to provide backup power, grid islanding, supplemental power, any other suitable source of AC power, or any combination thereof).

FIG. 2 is an illustrative block diagram showing additional details of some components of power electronics equipment, in accordance with some embodiments of the present disclosure. Memory 111 may be an electronic storage device. As referred to herein, the phrase "electronic storage device" or "storage device" will be understood to mean any device for storing electronic data, computer software, or firmware, such as random-access memory, read-only memory, solid state devices, or any other suitable fixed or removable storage devices, and/or any combination thereof. Memory 111 may be used to store various types of instructions, rules, and/or other types of data. In some embodiments, control circuitry 112 executes instructions for an application stored in memory 111 (e.g., to implement one or more switching schemes of DAB converter 114). Specifically, control circuitry 112 may be instructed by the application to perform the functions discussed herein, including sending control signals to toggle individual switches and/or legs of switches. In some embodiments, any action performed by control circuitry 112 may be based on instructions received from the application. In some embodiments, the application may be implemented as software or a set of executable instructions that may be stored in memory 111 and executed by control circuitry 112.

Memory 111 may store settings 202, instructions 204, and rules 206. Example types of settings 202 may include PEM output settings, DAB control settings (e.g., DAB switch toggling settings), DAB switching schemes, duty cycle settings, delay settings, other types of PEM settings, or any combination thereof. Example types of rules 206 include mappings for applying DAB control settings based on PEM output settings, computational constants (e.g., properties of inductors, transformers, switches, transistors, capacitors, or other electronics of DAB converter 114), overvoltage conditions, overcurrent conditions, negative current conditions, switching sequences, DAB models, DAB controls, snubber capacitor constraints (e.g., maximum tolerable current or temperature), other types of information or data, or any combination thereof. In some embodiments, instructions 204 are executed by control circuitry 112 to implement steps of various methods described herein (e.g., based on applicable settings 202 and/or rules 206).

DAB converter 114 includes transformer 218 (including a primary bridge winding and a secondary bridge winding), primary side bridge 220, and secondary side bridge 222. Primary side bridge 220 is coupled to a primary side of transformer 218 through series inductor 216. Secondary side bridge 222 is coupled to a secondary side of transformer 218. As used herein, the "primary side" or "primary bridge" of a DAB converter (e.g., DAB converter 114 or 300) may refer to the portion of a DAB converter appearing to the left of a transformer (e.g., transformer 218), and the "secondary side" or "secondary bridge" of DAB converter 114 may refer to the portion of a DAB converter appearing to the right of a transformer. As used herein, Vp and Vs refer to the voltage on the primary side of transformer 218 and the voltage on the secondary side of transformer 218, respectively. DAB converter 114 also includes primary side switches S1, S2, S3, and S4 located on the primary side of DAB converter 114 and secondary side switches S5, S6, S7, and S8 located on the secondary side of DAB converter 114. As used herein, a "leg" of a DAB converter bridge refers to a pair of switches that are coupled in series (e.g., switches S1 and S2, S3 and S4, S5 and S6, or S7 and S8). Switches S1, S2, S3, S4, S5, S6, S7, and S8 may be any suitable type of electronic switch, such as a field effect transistor (FET)-based switch, that can be enabled (e.g., switched on/closed, during which current is permitted to be conducted between its source and drain terminal) or disabled (e.g., switched off/open, during which current is effectively prevented from being conducted between its source and drain terminal) by changing a logic level of the control signal provided to its gate terminal, for example from a logic-high to a logic-low. In some embodiments, legs of DAB converter 114 may be toggled (e.g., periodically opened and closed) in response to control signals from control circuitry 112, where such signals may correspond to a desired power output of PEM 105 and may include particular temporal delays to minimize currents across snubber capacitors, maximize power output, and achieve other desirable control effects, or any combination thereof. In some embodiments, switches S1-S8 may be wide bandgap (WBG) based power semiconductors, such gallium nitride (GaN) or silicon carbide (SiC) based semiconductors. In some embodiments, switches S1-S8 may include other types of metal-oxide semiconductor field-effect transistors (MOSFETs). As shown, each of the switches S1-S8 includes an anti-parallel diode. As will be understood by those skilled in the art, toggling legs of the switches S1-S8 may produce a resonant (e.g., ripple) current (e.g., dependent on the timing of toggling the leg) through components with DC resonant links to the switches. Control circuitry 112 may further operate the legs to compensate for effects of this resonant current.

In some embodiments, temperature sensors 224-1, 224-2, 224-3, 224-4, 224-5, 224-6, 224-7, and 224-8 (collectively referred to as temperature sensors 224), are coupled to, and configured to measure the temperatures of, switches S1, S2, S3, S4, S5, S6, S7, and S8, respectively. Temperature sensors 224-1, 224-2, 224-3, 224-4, 224-5, 224-6, 224-7, and 224-8, output to control circuitry 112 signals ($S_{TEMP}(1)$ through $S_{TEMP}(8)$, collectively, $S_{TEMP}(1:8)$) indicating sensed temperatures of switches S1 through S8, respectively. In some embodiments, data from one or more temperature sensors 224-1, 224-2, 224-3, 224-4, 224-5, 224-6, 224-7, and 224-8 may be indicative of voltage levels and/or temperature changes occurring across snubber capacitors (which are omitted from FIG. 2 for clarity) coupled to primary side bridge 220 or secondary side bridge 222. Complete signal paths from output ports $S_{TEMP}(1)$ through $S_{TEMP}(8)$ of temperature sensors 224-1, 224-2, 224-3, 224-4, 224-5, 224-6, 224-7, and 224-8 to temperature input port 211 ($S_{TEMP}(1:8)$) of control circuitry 112 are omitted from FIG. 2 for clarity. Nonetheless, output ports $S_{TEMP}(1)$ through $S_{TEMP}(8)$ of temperature sensors 224-1, 224-2, 224-3, 224-4, 224-5, 224-6, 224-7, and 224-8 are indeed coupled to temperature input port 211 ($S_{TEMP}(1:8)$) of control circuitry 112 through a signal bus or other suitable respective signal paths. In some embodiments, one or more of temperature sensors 224 may be omitted. For example, in some embodiments, only a single temperature sensor may be provided for each leg or for each side of DAB converter 114.

In some embodiments, current sensor 229 is configured to sense output current (i_OUT) of PEM 105 and output to control circuitry 112 a signal indicating the output current as is delivered to output power 130. A signal from current sensor 229 may be used to determine a switching scheme of DAB converter 114 (e.g., how to toggle the legs therein). For example, current sensor 229 may indicate an output power 130 of PEM 105, where the output power may be associated with a particular switching scheme of DAB converter 114.

In some embodiments, current sensor 219 is configured to sense an output current ($I_{DC\_OUT}$). Current sensor 219 may be configured the same as current sensor 229, including to be used by control circuitry 112 to determine a switching scheme of DAB converter 114. Voltage sensor 221 may be coupled in parallel to current sensor 219 to measure an output voltage ($V_{DC\_OUT}$) of PEM 105, and a signal from voltage sensor 221 may also be used to determine a switching scheme of DAB converter 114.

In some embodiments, current sensor 226 is configured to sense the current across the secondary side of transformer 218 and to output to control circuitry 112 a signal indicating the secondary side transformer current. In some embodiments, a signal from current sensor 226 (with or without the signal from current sensor 219) may be used to determine a switching scheme of DAB converter 114. In some embodiments, a voltage sensor may be coupled in parallel to current sensor 226 or in another suitable location to measure a transformer voltage. In some embodiments, with or without the signal from voltage sensor 221, such a voltage sensor may be used to determine a switching scheme of DAB converter 114.

In some embodiments, current sensor 225 is configured to sense the current across the primary side of transformer 218 and output to control circuitry 112 a signal indicating the primary current. In some embodiments, a signal from current sensor 225 (with or without the signal from current sensor 219) may be used to determine a switching scheme of DAB converter 114. In some embodiments, a voltage sensor may be coupled in parallel to current sensor 225 or in another suitable location to measure a transformer voltage. In some embodiments, voltage sensor 221 or any other voltage sensor may be used to determine a switching scheme of DAB converter 114.

Control circuitry 112 includes memory interface port 208, first input port 210 ($V_{IN\ Probe}$), temperature input port 211, second input port 212 ($V_{OUT\ Probe}$), current input port 213, and multiple output ports 214. Control circuitry 112 is configured to transmit and receive instructions, settings, rules, and/or other types of data to and from memory 111 via memory interface port 208. For example, control circuitry 112 may be configured to implement particular switch toggling schemes based on instructions from memory 111. Control circuitry 112 is configured to sense a temperature of one or more of switches S1-S8. Control circuitry 112 is configured to sense primary current iL via current input port 213. In some embodiments, current input port 213 is configured to provide a current level indicative of a switching scheme of DAB converter 114. In some embodiments, the instructions are based on a desired output power of DAB converter 114, one or more current or voltage signals recorded in DAB converter 114, one or more temperature sensors of DAB converter 114, system status indicators, any other suitable information, or any combination thereof Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG. 2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. In some embodiments, control circuitry 112 is configured to cause switch toggling based on sending control signals (e.g., switch control signals $S1_{CTL}$, $S2_{CTL}$, $S3_{CTL}$, $S4_{CTL}$ of primary side bridge 220, and/or switch control signals $S5_{CTL}$, $S6_{CTL}$, $S7_{CTL}$, and $S8_{CTL}$ of secondary side bridge 222) that are provided according to a switching sequence to minimize resonant DC power links (e.g., ripple currents) between the switches and other components (e.g., snubber capacitors) coupled to the switches and/or the bridges of the transformer. In some embodiments, the switching sequences are further configured to maximize power output of PEM 105 while minimizing the resonant DC power links.

The output of DAB converter 114 is coupled to a load that is configured to receive output power 130. For example, either of electric vehicle 108 or ESS 110 may be charged using output power 130. In response to dynamic power requirements of output power 130, control circuitry 112 may adjust switching schemes of DAB 114 to deliver particular levels of dynamic power. For example, DAB 114 may provide more power (e.g., faster charging) when the state-of-charge of electric vehicle 108 or ESS 110 is low (e.g., less than 5%, 10%, 20%, or any other suitable low state-of-charge) and DAB may provide less power (e.g., slower charging) when the state-of-charge of electric vehicle 108 or ESS 110 is high (e.g., greater than 80%, 90%, 95%, or any other suitable high state-of-charge).

In some embodiments, types of switches and/or switch configurations that differ from those shown in FIG. 2 may be utilized (e.g., switches with source and drain terminals located in positions that are the opposite of those shown in FIG. 2, active-high switches that are enabled with a logic-high gate voltage, active-low switches that are enabled with a logic-low gate voltage, or the like). The particular switches and configurations and logic levels shown and described herein are provided as illustrative examples. The principles herein apply similarly to other types of switches and/or switch configurations. The switches relating to the examples described herein are active-high switches that are closed (e.g., turned on) with a logic-high gate voltage and are open (e.g., turned off) with a logic-low gate voltage.

Although a PEM 105 is illustrated and described, it should be understood that DAB converter 114 may be used for any power system that includes handling of direct current (DC) as an input, output, or intermediate power, such as to charge electric vehicle 108 or ESS 110.

FIG. 3 is an illustrative circuit schematic 300 of a dual active bridge (DAB) converter, in accordance with some embodiments of the present disclosure. In some embodiments, circuit schematic 300 may correspond to DAB converter 114. In some embodiments, elements 324, 326, 328, 330, 332, 342, 344, 346, 348, and 366, may correspond to elements S1, S2, S3, S4, 216, S5, S6, S7, S8, and 130, respectively. In some embodiments, windings 334 and 336 may correspond to the primary bridge winding of transformer 218 and the secondary bridge winding of transformer 218, respectively. In some embodiments, source 302 may correspond to $DC_{IN}$ power provided to DAB 114. In some embodiments, battery 366 may correspond to battery 109, ESS 110, or a combination thereof.

DAB converter 300 may transfer DC power from source 302 to battery 366. DAB converter 300 includes transformer 335 with primary bridge winding 334 and secondary bridge winding 336. On the primary bridge side, DAB converter 300 includes bulk DC capacitors 304, 306, 308, 310, 312, and 314, snubber capacitors 320 and 322, switches 324 and 326 (e.g., first leg switches), switches 328 and 330 (e.g., second leg switches), and inductor 332. On the secondary bridge side, DAB converter 300 includes bulk DC capacitors 354, 356, 358, 360, 362, and 364, snubber capacitors 338 and 340, switches 342 and 344 (e.g., third leg switches), and switches 346 and 348 (e.g., fourth leg switches). The bulk DC capacitors may improve an impedance matching between source 302 and primary bridge side components, or between battery 366 and secondary bridge side components. The snubber capacitors may absorb resonant DC power (e.g., ripple currents generated in response to switch toggling). The switches may be toggled to control power flows across transformer 335. Inductor 332 may be a coupling inductor to improve an impedance matching between primary bridge winding 334 and other primary bridge side components. In addition, inductances 316, 318, 350, and 352 are shown as discrete elements; however, it will be understood that these inductances may not represent winding-based inductors, but rather may represent non-zero leakage inductances present in the circuit. For example, the leakage inductances may be attributed to non-zero inductances of wires, capacitors, transformers, other discrete electronic devices, lumped circuit components, or any combination thereof. In FIG. 3, the inductances as seen from the input and output of source 302 and battery 366, may be represented by leakage inductors or inductances 316, 318, 350, and 352. In some embodiments, the leakage inductors or inductances 316, 318, 350, and 352 may correspond to leakage inductance that occurs between one or more snubber capacitors (e.g., capacitors 320, 322, 338, or 340) and one or more bulk DC capacitors (e.g., capacitors 304, 306, 308, 310, 312, 314, 354, 356, 358, 360, 362, or 364). In some embodiments, the leakage inductance may additionally or otherwise be based on the inductances of one or more print circuit board assembly trace (e.g., wire, pin, connector, braid, or other suitable mating), one or more laminated busbar coupled to the DAB converter, or any combination thereof. In some embodiments, a resonance time may be based on one or more of these leakage inductances and the net capacitance (e.g., a sum of the capacitances of one or more snubber capacitors and one or more bulk DC capacitors) coupled to the one or more leakage inductances. In some embodiments, the resonance time may be equal to the reciprocal square root of (i) the lumped leakage inductance multiplied by (ii) the lump capacitance. As will be further described below, these inductors or inductances therefore may influence resonance times of the bridges of DAB converter 300 (e.g., how quickly power flows through a resonant DC link from a switch to a snubber capacitor or other connected circuit element, in response to switch toggling), and these resonance times may be used to control switch toggling such that the resonance link power transferred to snubber capacitors may be minimized or otherwise limited to within a specified range.

As used to deliver varying amounts of power to battery 366, various switching schemes for toggling legs of the DAB converter 300 during a duty cycle are described as follows. It will be understood that these switching schemes are representative of particular embodiments that may be modified without departing from the teachings herein. In some embodiments, in a low-power switching scheme, as the first operation, the second leg switches (e.g., switches 328 and 330) may be toggled at the start of the duty cycle. During toggling of this leg (and all other legs, unless otherwise indicated), one switch of the leg may be closed and the other switch of the leg may simultaneously be opened. In the present example, switch 328 may be opened and switch 330 may be closed. This initial toggling of the second leg may begin a period of increasing current through inductor 332. It will be understood that increasing current may refer to reducing the magnitude of a negative current (e.g., approaching and/or passing the zero-current point). After the first operation and a first phase shift delay (e.g., an intra-bridge phase shift delay), as the second operation, the first leg (e.g., switches 324 and 326) may be toggled by closing switch 324 and opening switch 326. The first phase shift delay may be configured to control circulating current through inductor 332 (and, by extension, transformer 335) and/or control a range of conditions under which desirable zero-voltage switching may be achieved. For example, the first phase shift delay may be 12.5% of the duty cycle. After the second operation, as the third operation, the fourth leg (e.g., switches 346 and 348) may be toggled by opening switch 346 and closing switch 348. While occurring sequentially after the second operation, the third operation may be controlled relative to the first operation based on a second phase-shift delay (e.g., an inter-bridge phase shift delay). The second phase shift delay may control a direction and magnitude of power flowing through inductor 332 (and, by extension, transformer 335). For example, the second phase shift delay may be 25% or 50% of the duty cycle or any other value. After the third operation and the first phase shift delay, as the fourth operation, the third leg (e.g., switches 342 and 344) may be toggled by closing switch 342 and opening switch 344. These four operations may represent all the control signals sent during a first portion of the duty cycle. In a second portion of the duty cycle, the four aforementioned operations may be repeated in the same order and with the same phase shift delays, but for each operation, the toggling may be inverted (e.g., for each respective leg, the switch that previously closed may be opened, and the switch that previously opened may be closed). In an example, the length of each portion of the duty cycle may be 50% of the duty cycle, such that each switch may be opened and closed for 50% of the duty cycle.

FIG. 4 is an illustrative depiction of power flows 400 during a first switching scheme of a DAB converter, in accordance with some embodiments of the present disclosure. For example, the power flows 400 may represent signals developed during the low-power switching scheme as described above. It will be understood that, depending on the DAB converter configuration, the power flows 400 may correspond to either bridge, any leg of switches coupled to the bridge, and any one or more snubber capacitors coupled to the bridge. Signal 402 corresponds to a current across a snubber capacitor (e.g., any one of snubber capacitors 320, 322, 338, or 340). Signals 404 and 406 respectively correspond to a bridge winding voltage and a bridge winding current. Before time $t_1$ 408, based on a configuration of the four legs of the DAB converter, the bridge winding voltage 404 is at a relatively large negative value and the bridge winding current 406 is at zero. At time $t_1$ 408, a first leg of switches is toggled such that bridge winding voltage 404 increases toward zero and current 406 increases to a relatively large positive value. As a consequence of the switch toggling and the corresponding changes in voltage 404 and current 406, a ripple current 402 develops across a snubber capacitor coupled to the bridge. At time $t_2$ 410, a second leg of switches (e.g., the other leg on the same side of the DAB converter bridge as the first leg of switches) is toggled after ripple current 402 has substantially attenuated. At time $t_3$ 412, inverted toggling of the first leg of switches causes another ripple current, comparable to that of the switching at time $t_1$ 408, to develop across the snubber capacitor. If not compensated for (e.g., by oversizing the snubber capacitor or implementing control techniques to mitigate the ripple current magnitude), these ripple currents 402 may cause the snubber capacitor to fail. While the voltage 404 and current 406 profiles may vary according to which leg of the DAB converter is toggled, it will be understood that snubber current 402 may be representative of a current induced across at least one snubber capacitor by a toggling of any single leg of DAB converter 114 or 300.

With reference to the low-power switching scheme described above, a high-power switching scheme may include simultaneous switching of the first and second legs and/or simultaneous switching of the third and fourth legs. For example, the first phase shift delay (e.g., the intra-bridge phase shift delay between the first and second or third and fourth operations) may be reduced to zero with the other switching controls unchanged. As representative examples of two particular switching schemes (among many possible schemes) with particular characteristics (among many possible characteristics, based on the relevant switching scheme), these aforementioned schemes are denoted "low-power" and "high-power" based on the relative amounts of power that they may deliver to battery 366 or any other suitable load. Therefore, the length of the temporal delay may be inversely proportional to the power delivered by the DAB converter.

FIG. 5 is an illustrative depiction of power flows 500 during a second switching scheme of a DAB converter, in accordance with some embodiments of the present disclosure. For example, the power flows 500 may represent signals developed during the high-power switching scheme as described above. Signal 502 corresponds to current across a snubber capacitor (e.g., any one of snubber capacitors 320, 322, 338, or 340). Signals 504 and 506 respectively correspond to a bridge winding voltage and a bridge winding current. Before time $t_1$ 508, based on a configuration of the four legs of the DAB converter, the bridge winding voltage 504 is at a relatively large negative value and the bridge winding current 506 is at zero. At time $t_1$ 508, first and second legs of switches are simultaneously toggled such that bridge winding voltage 504 and current 506 increase to relatively large positive values. As a consequence of the switch toggling and the corresponding changes in voltage 504 and current 506, a ripple current 502 develops across a snubber capacitor coupled to the bridge. Similarly, inverted toggling of the first and second legs of switches at time $t_2$ 510 causes a comparable ripple current to develop across the snubber capacitor. Compared to ripple current 402, ripple current 502 has a greater magnitude due to the simultaneous toggling of the first and second legs of switches. Consistent with low- and high-power switching schemes, compared to current 406, the peak magnitude of current 506 is greater. While the voltage 504 and current 506 profiles may vary according to which legs of the DAB converter are toggled, it will be understood that snubber current 502 may be representative of a current induced across at least one snubber capacitor by any simultaneous toggling of two legs of a single side of DAB converter 300.

With reference to the high-power switching scheme described above, a drawback is the high snubber capacitor currents. It is desirable to maintain high-power switching without developing such high currents across the snubber capacitors. In accordance with embodiments of the present disclosure, high-power switching schemes with minimized snubber capacitor currents are provided without sacrificing appreciable power output. In some embodiments, snubber capacitor currents may be minimized by timing leg toggling based on the oscillatory nature of the ripple current. Specifically, a pair of legs may be toggled nearly simultaneously, with a small temporal delay prescribed based on a resonance time of the bridge (e.g., as reflected in the waveform of the snubber capacitor current oscillation). As a result of the small temporal delay, a first ripple current caused by toggling of a first leg may be cancelled out by a second ripple current caused by slightly delayed toggling of a second leg. In other words, rather than generating two currents with constructive resonance at the snubber capacitor, as occurs with simultaneous toggling of a pair of legs, two currents with destructive resonance may be generated at the snubber capacitor based on the slight delay between toggling of the two legs.

FIG. 6 is an illustrative depiction of power flows 600 during a third switching scheme of a DAB converter, in accordance with some embodiments of the present disclosure. For example, the power flows 600 may represent signals developed during the high-power switching scheme with minimized snubber capacitor currents as described above. Signal 602 corresponds to current across a snubber capacitor (e.g., any one of snubber capacitors 320, 322, 338, or 340). Signals 604 and 606 respectively correspond to a bridge winding voltage and a bridge winding current. Before time $t_1$ 608, based on a configuration of the four legs of the DAB converter, the bridge winding voltage 604 is at a relatively large negative value and the bridge winding current 606 is at zero. At time $t_1$ 608, the first leg of switches is toggled such that bridge winding voltage 604 increases to a relatively small negative value and current 606 increases to a relatively large positive value. Very soon thereafter, at time $t_2$ 610, the second leg of switches is toggled such that bridge winding voltage 604 increases to a relatively large positive value. The short delay is further highlighted by the hitch in the voltage 604 curve shown in box 612. As a consequence of the switch toggling and the corresponding changes in voltage 604 and current 606, a ripple current 602 develops across a snubber capacitor coupled to the bridge. Compared to ripple currents 502 and 402, ripple current 602 has a smaller magnitude due to the slight delay between toggling of the first and second legs of switches. Due to this slight delay, there may be a significant (e.g., ~2.7×) decrease in the peak magnitude of ripple current 602 compared to that of ripple current 502, with only a ~10% lower peak bridge current 606 compared to that of current 506. This performance may represent a desirable tradeoff. Moreover, the 10% magnitude of power loss in the switching scheme corresponding to power flows 600 can be reduced, as described below. In the second portion of the duty cycle, inverted toggling of the first and second legs of switches, with the short temporal delay, occurs at times $t_3$ 614 and $t_4$ 616, as highlighted by the hitch in the voltage 604 curve shown in box 618. Again, this toggling causes another minimized ripple current 602 to develop across the snubber capacitor. While the voltage 604 and current 606 profiles may vary according to which legs of the DAB converter are toggled, it will be understood that snubber current 602 may be representative of a current induced across at least one snubber capacitor in response to a slight delay between the toggling of the two legs of a single side of DAB converter 300.

With further reference to the high-power switching scheme with minimized snubber capacitor currents, more operational details are provided. The short temporal delay between switching the first and second legs of a bridge may correspond to a resonance time of the bridge. This resonance time may be indicative of the transient response of a resonant DC loop (e.g., including the snubber capacitor and the winding of the bridge) that may be induced in response to toggling. For example, the resonance time may correspond to how long it takes for resonant current to conduct through the loop and charge the one or more snubber capacitor. In some embodiments, the resonance time may be based on a capacitance of at least two capacitors coupled to the bridge (e.g., at least one snubber capacitor and at least one bulk DC capacitor) and an inductance between the at least two capacitors. For example, the resonance time of a given bridge (e.g., of DAB converter 300) may be calculated as the reciprocal square root of (i) the bridge inductance (e.g., based on the inductances 316 and 318, or the inductances 350 and 352) multiplied by (ii) the bridge capacitance (e.g., based on the capacitances of capacitors 304, 306, 308, 310, 312, 314, 320, and 322, or the capacitances of capacitors 338, 340, 354, 356, 358, 360, 362, and 364). In some embodiments, the temporal delay is set equal to half of, 1.5×, or 2.5× the resonance time, where the shortest of these delay times may result in the best snubber capacitor current minimization.

For example, based on one or more snubber capacitances and one or more leakage inductances, the resonance time of a bridge may be 1 μs or less. With a DAB converter operation (e.g., at 50 kHz frequency), a temporal leg-toggling delay corresponding to such a resonance time would be significantly shorter than a temporal leg-toggling delay as may be used during low-power switching schemes to control circulating current through inductor 332 (and, by extension, transformer 335) and/or control a range of conditions under which desirable zero-voltage switching may be achieved.

In some embodiments, to maximize power output and specifically to compensate for the small loss in output power incurred as a result of the short temporal delay, a modified phase shift delay may be introduced between operating the primary and secondary side bridges of DAB converter 300. The magnitude of the modified phase shift delay may be determined by the maximum duty ratio of the primary and secondary side bridges of DAB converter 300, as described below. In some embodiments, a duty ratio of 0.5 is applied (e.g., each switch is opened and closed for half of the duty cycle). For the case of leg toggling with a short temporal delay, due to the temporal delay, the maximum duty ratio may be less than 0.5. In particular, the maximum duty ratio for each side may be equal to $0.5*(T_s-T_{res})/T_s$, or alternatively $0.5*(T_s-n*T_{res})/T_s$, where $T_s$ is the sampling time of the DAB converter (e.g., DAB converter 300), $T_{res}$ is the resonance time for the DC link circuit coupled to the relevant side bridge of the DAB, and n is an odd scalar of the resonance time. For example, n may be equal to 1, 3, 5, 7, or higher odd numbers, where lower values of n may result in more effective cancellation of snubber capacitor currents. In some embodiments, the resonance time is created by the leakage inductance (e.g., as represented by inductances 316, 318, 350, and/or 352) and capacitance (e.g., based on one or more bulk capacitors 304, 306, 308, 310, 312, 314, 354, 346, 358, 360, 362, or 364, one or more snubber capacitors 320, 322, 338, or 340, or any combination thereof) associated with circuitry linking a DC power input (e.g., source 302) or output (e.g., battery 366) to a bridge of the DAB converter. In some embodiments, the resonance time is fixed based on the physical implementation of the DAB converter circuitry (or subcircuits thereof). Based on the maximum duty ratio for switching with a slight temporal delay, a modified phase shift delay may be applied such that the secondary side bridge of the DAB converter may be activated at the halfway-point of a given duty cycle (as opposed to immediately after finishing operating the primary side bridge of the DAB converter, as would occur without the modified phase shift delay). For example, DAB converter 300 may be operated with a sampling period of 20 μs and may have a primary side resonance time of 1 μs. Thus, the maximum duty ratio for the primary side would be reduced from 0.5 to 0.475, and in response, a modified phase shift delay of 5.5 μs (i.e., a quarter of a sampling period plus 2.5% of a sampling period) may be applied between toggling legs of the primary bridge side and toggling legs of the secondary bridge side.

In some embodiments, other lengths of time may be provided for the sampling period, resonance time, short temporal delay, and phase shift delay. For example, the sampling period may be 10 μs, 30 μs, 50 μs, or any suitable time corresponding to a toggling frequency in the 1-1,000 kHz range. For example, the resonance time may be 0.1 μs, 0.5 μs, 2 μs, 5 μs, or any other suitable time corresponding to a resonance frequency in the 100 kHz-10 MHz range. For example, the short temporal delay may be the product of any resonance time multiplied by a decimal number ending in 0.5 (e.g., 0.5, 1.5, 2.5, 3.5, 4.5, or 5.5). For example, the phase shift delay may be based on a fraction of a duty cycle (e.g., 0.1, 0.2, 0.23, 0.25, 0.27, 0.3, 0.4, 0.45, 0.475, 0.5, 0.525, 0.55, 0.6, 0.7), a fraction of a sample period (e.g., the sample period multiplied by the fraction of a duty cycle), either of the aforementioned times plus-or-minus a resonance time (or a resonance time multiplied by a decimal number ending in. 5), or any combination thereof. In some embodiments, the phase shift delay may be set according to a desired power output of the DAB converter, e.g., to optimize for power efficiency when a relatively low fraction of the maximum power output is supplied and/or a relatively low duty ratio is applied.

FIG. 7 is an illustrative flowchart of a first method 700 for controlling switches of a DAB converter, in accordance with some embodiments of the present disclosure. At 702, the method includes sending a first control signal (e.g., using control circuitry 112) to toggle a first pair of switches of a bridge of a dual active bridge (DAB) converter (e.g., DAB converter 114 or DAB converter 300). In some embodiments, the first control signal may be provided by any one pair of ports $S1_{CTL}$ and $S2_{CTL}$, $S3_{CTL}$ and $S4_{CTL}$, $S5_{CTL}$ and $S6_{CTL}$, or $S7_{CTL}$, and $S8_{CTL}$. In some embodiments, the first pair of switches may include any one pair of switches S1 and S2, S3 and S4, S5 and S6, S7 and S8, 324 and 326, 328 and 330, 342 and 344, or 346 and 348.

At 704, the method 700 continues by sending a second control signal to toggle a second pair of switches of the bridge, wherein a temporal delay (e.g., as retrieved from memory 111) separates the toggling caused by the first control signal from the toggling caused by the second control signal, and the temporal delay is based on a resonance time for the bridge. In some embodiments, with respect to whichever one pair of switches and corresponding pair of ports is operated on at 702, the alternate pair of switches on the same side of the DAB converter and the corresponding ports may be operated on at 704. In some embodiments, the temporal delay corresponds to either of the hitches 612 and 618 in the voltage curve 604.

In some embodiments, method 700 may be extended for operation through a full duty cycle, including sending third and fourth, fifth and sixth, and seventh and eighth control signals, each separated by the temporal delay. During the duty cycle, initial and subsequent signals applied to each switch cause each switch to be opened and closed. In some embodiments, the length of each closed period for each switch may correspond to a maximum duty ratio for the corresponding bridge of the DAB converter. In particular, based on the introduction of the short temporal delay, the maximum duty ratio for a bridge of the DAB converter may be less than 0.5 (e.g., the maximum duty ratio may be shortened according to the resonance time and the sampling time, as described above). In other words, the short temporal delay may remove a portion of the time through which the bridge of the DAB converter would otherwise drive current. In some embodiments, a phase shift delay between bridges of the DAB converter may be applied between the toggling of the first and fifth, second and sixth, third and seventh, and fourth and eighth control signals, and the length of the phase shift delay may be determined based on the maximum duty ratio. In some embodiments, with respect to a phase shift delay applied in the absence of a short temporal delay, a modified phase shift delay may be applied in response to applying the short temporal delay, where the modified phase shift delay is based on the maximum duty ratio as determined by the short temporal delay. For example, the short temporal delay may reduce the maximum duty ratio by 0.02 (e.g., from 0.5 to 0.48), and in response, the phase shift delay (e.g., which was originally 0.25) may be increased or decreased by an amount corresponding to the difference between the maximum duty ratios with and without the short temporal delay (e.g., the modified phase shift delay may be 0.27 or 0.23). Similarly, the modified phase shift delay may correspond to a multiple of the difference between the maximum duty ratios with and without the short temporal delay (e.g., 0.25×, 0.5×, 1.5×, 2× the difference between the maximum duty ratios). In some embodiments, the modified phase shift delay maximizes power output of the DAB converter while still minimizing the snubber capacitor current.

FIG. 8 is an illustrative switch timing diagram 800 including a short temporal delay. In some embodiments, the switch timing diagram corresponds to implementation of method 700 or related switching schemes for minimizing DC link resonance (e.g., minimizing current on a snubber capacitor). The vertical axis of timing diagram 800 shows four switches (i.e., S1, S3, S5, and S7) with high (e.g., closed or electrically connected) and low (e.g., open or electrically disconnected) states, as indicated by levels of the traces corresponding to the switches. The horizontal axis of timing diagram 800 shows a progression of time, with moments when control signals are transmitted indicated by CS1, CS2, CS3, CS4, CS5, CS6, CS7, and CS8 (e.g., respectively, first, second, third, fourth, fifth, sixth, seventh, and eighth control signals). In some embodiments, switches S1, S3, S5, and S7 may respectively correspond to 324 or 326, 328 or 330, 342 or 344, and 346 or 348. In some embodiments, control signals CS1, CS2, CS3, CS4, CS5, CS6, CS7, and CS8 may respectively correspond to signals from ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$, and these signals may be provided by control circuitry 112 based on instructions stored in memory 111.

At the initial time in timing diagram 800, control signal CS1 toggles switch S1. It will be understood that in some embodiments, each toggling of S1, S3, S5, and S7 is accompanied by an inverted toggling of the corresponding switch included in the signal-receiving leg of switches. For example, concurrent with S1 (e.g., 324) being toggled to the high state, a corresponding switch (e.g., S2 or 326) may be toggled to the low state (e.g., as would be shown by inverting the high/low states of the traces shown in timing diagram 800). After a short temporal delay of length α, as indicated by the shorter arrow, control signal CS2 toggles switch S3. Based on the short temporal delay, a minimized DC link resonant current (e.g., as depicted by current 602) may develop across one or more snubber capacitors (e.g., any one or more of snubber capacitors 320, 322, 338, or 340). As mentioned, the length α of the short temporal delay may correspond to 0.5×, 1.5×, 2.5×, 3.5×, or 4.5× of the resonance time of the DAB bridge to which switch S1 is coupled. In some embodiments, the length α may be less than 1% 2%, 3%, 4%, 5%, 6%, 7%, 8%, 9%, or 10% of the duty cycle of the DAB converter. In some embodiments, the length α may be adjusted based on a power output of the DAB converter, a switching frequency of the DAB converter, an operating parameter of the DAB converter (e.g., a snubber capacitor current, a DC bulk capacitor current, a temperature of any one or more DAB converter components), a charge level of an electric vehicle, or any combination thereof.

After the toggling of S1 (as caused by control signal CS1) and the toggling of S3 (as caused by control signal CS2), switch S5 may be toggled as caused by control signal CS3. A phase shift delay of temporal length φ, as indicated by the longer arrow, may separate control signal CS1 from control signal CS3 and it may separate control signal CS4 from control signal CS4. As mentioned, in some embodiments, the phase shift delay φ may be configured based on a maximum duty ratio corresponding to one or both of the bridges of the DAB converter (e.g., based on a duty ratio of one or more switches S1, S2, S3, S4, S5, S6, S7, or S8). For example, while FIG. 8 may depict an unmodified phase shift delay φ (e.g., based on 25% of a duty cycle), a modified phase shift delay φ may applied based on lengthening or shortening the unmodified phase shift delay, where the amount of the modification may be based on a difference between a maximum duty ratio without the short temporal delay and a maximum duty ratio with the short temporal delay.

Consistent with control signals CS1 and CS2, the short temporal delay of length α may separate the toggling of S5 (as caused by control signal CS3) from the toggling of S7 (as caused by control signal CS4). In some embodiments, these four control signals constitute half of the switching operations associated with a full duty cycle. During the second half of such a duty cycle, as shown in FIG. 8, the toggling of S1, S3, S5, and S7 (as respectively caused by control signals CS5, CS6, CS7, and CS8) may be repeated in sequence, after which each of these switches (and the other switch included in the relevant leg) may reside at their states as shown at the initial time of FIG. 8. The short temporal delay of length α may separate control signal CS5 from control signal CS6, as well as control signal CS7 from control signal CS8. The phase shift delay of temporal length φ may separate control signal CS5 from control signal CS7, as well as control signal CS6 from control signal CS8. While the temporal lengths α and φ are represented as similar (or equal) in the first (e.g., primary side is activated) and second (e.g., secondary side is activated) halves of the duty cycle shown in FIG. 8, it will be understood that one or both of these values may be independently set for each bridge of a DAB converter (and corresponding half of a duty cycle). For example, based on different resonance times of the primary and secondary sides of a DAB converter, the temporal length α as separates CS1 from CS2 (and CS5 from CS6) may differ from the temporal length separating CS3 from CS4 (and CS7 from CS8). Likewise, based on different maximum duty ratios for the primary and secondary sides of a DAB converter (e.g., based on different resonance times thereof), the temporal length φ as separates CS1 from CS3 may differ from the temporal length φ separating any one or more of CS2 from CS4, CS3 from CS5, CS4 from CS6, CS5 from CS7, or CS6 from CS8 (and the φ associated with each pair of these control signals may also differ from that associated with each other pair of these control signals).

FIG. 9 is an illustrative flowchart of a second method 900 for controlling switches of a DAB converter, in accordance with some embodiments of the present disclosure. At 902, the method includes sending a first control signal (e.g., CS1) (e.g., using control circuitry 112) to toggle a first pair of switches of a primary bridge (e.g., primary side bridge 220) of a dual active bridge (DAB) converter (e.g., DAB converter 114 or DAB converter 300). In some embodiments, the first control signal may be provided by any one or both ports of the pairs of ports $S1_{CTL}$ and $S2_{CTL}$, $S3_{CTL}$ and $S4_{CTL}$, $S5_{CTL}$ and $S6_{CTL}$, or $S7_{CTL}$, and $S8_{CTL}$. In some embodiments, the first pair of switches may include any one pair of switches S1 and S2, S3 and S4, S5 and S6, S7 and S8, 324 and 326, 328 and 330, 342 and 344, or 346 and 348.

At 904, the method 900 continues by sending a fifth control signal (e.g., CS5) to toggle a third pair of switches of a secondary bridge (e.g., secondary side bridge 222) of the DAB converter, where a phase shift delay (e.g., phase shift delay φ of FIG. 8) (e.g., as retrieved from memory 111 and/or determined by rules 206) separates the toggling caused by the first control signal from the toggling caused by the fifth control signal, and when a determined duty cycle (e.g., as retrieved from memory 111 and/or determined by rules 206) of a primary side or secondary side of the DAB converter is limited by a maximum duty ratio (e.g., as retrieved from memory 111 and/or determined by rules 206), the phase shift delay is adjusted based on the maximum duty ratio to modify an output power of the DAB converter.

In some embodiments, the phase shift delay is adjusted to increase an output power of the DAB converter. In some embodiments, the phase shift delay is adjusted to be shorter or longer than a quarter of the duty cycle, and the amount of the adjustment of the phase shift delay may be based on the difference between a quarter of the duty cycle and the maximum duty ratio. In some embodiments, with respect to whichever one pair of switches and corresponding pair of ports is operated on at 902, the corresponding pair of switches on the opposite side of the DAB converter and the corresponding ports may be operated on at 904.

The processes described above are intended to be illustrative and not limiting. One skilled in the art would appreciate that the steps of the processes described herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method comprising:

sending a first control signal to toggle a first pair of switches of a bridge of a dual active bridge (DAB) converter; and sending a second control signal to toggle a second pair of switches of the bridge, wherein:

a temporal delay separates the toggling caused by the first control signal from the toggling caused by the second control signal; and the temporal delay is based on a resonance time for the bridge to cause destructive resonance of a first ripple current generated by toggling the first pair of switches and a second ripple current generated by toggling the second pair of switches.

2. The method of claim 1, wherein:

the resonance time for the bridge is based on a capacitance of at least two capacitors coupled to the bridge and an inductance between the at least two capacitors coupled to the bridge; and the temporal delay corresponds to half of the resonance time.

3. The method of claim 1, further comprising:

sending third and fourth control signals to respectively toggle the first and second pairs of switches of the bridge, wherein:

the temporal delay separates the toggling caused by the third control signal from the toggling caused by the fourth control signal;

a duty cycle interval separates the toggling caused by the first and third control signals;

the duty cycle interval separates the toggling caused by the second and fourth control signals; and the duty cycle interval is based on a maximum duty ratio for the first and second pairs of switches of the bridge and a sampling time of the DAB converter.

4. The method of claim 3, wherein the maximum duty ratio is $0.5*(T_s-T_{res})/T_s$, wherein $T_s$ is the sampling time of the DAB converter and $T_{res}$ is the resonance time for the bridge of the DAB converter.

5. The method of claim 3, wherein the maximum duty ratio is $0.5*(T_s-n*T_{res})/T_s$, wherein $T_s$ is the sampling time of the DAB converter, $T_{res}$ is the resonance time for the bridge of the DAB converter, and n is an odd scalar of the resonance time.

6. The method of claim 1, wherein the bridge is a primary bridge of the DAB converter and the temporal delay is a first temporal delay, the method further comprising:

sending a fifth control signal to toggle a third pair of switches of a secondary bridge of the DAB converter; and sending a sixth control signal to toggle a fourth pair of switches of the secondary bridge, wherein:

a second temporal delay separates the toggling caused by the fifth control signal from the toggling caused by the sixth control signal; and the second temporal delay is based on a resonance time for the secondary bridge.

7. The method of claim 6, further comprising:

sending seventh and eighth control signals to respectively toggle the third and fourth pairs of switches of the secondary bridge, wherein:

the second temporal delay separates the toggling caused by the seventh control signal from the toggling caused by the eighth control signal;

a duty cycle interval separates the toggling caused by the fifth and seventh control signals;

the duty cycle interval separates the toggling caused by the sixth and eighth control signals; and the duty cycle interval is based on a maximum duty ratio for the third and fourth pairs of switches of the bridge and a sampling time of the DAB converter.

8. The method of claim 6, wherein:

the toggling caused by the first control signal and the toggling caused by the fifth control signal are separated by a phase shift delay.

9. The method of claim 8, wherein:

when a determined duty cycle of a primary side or secondary side of the DAB converter is limited by a maximum duty ratio, the phase shift delay is adjusted based on the maximum duty ratio to modify an output power of the DAB converter.

10. The method of claim 1, wherein the first ripple current and the second ripple current cancel at a capacitor of the bridge.

11. A method comprising:

sending a first control signal to toggle a first pair of switches of a primary bridge of a dual active bridge (DAB) converter;

sending a second control signal to toggle a second pair of switches of the primary bridge; and sending a fifth control signal to toggle a third pair of switches of a secondary bridge of the DAB converter, wherein:

a phase shift delay separates the toggling caused by the first control signal from the toggling caused by the fifth control signal;

when a determined duty cycle of a primary side or secondary side of the DAB converter is limited by a maximum duty ratio, the phase shift delay is adjusted based on the maximum duty ratio to modify an output power of the DAB converter;

a temporal delay separates the toggling caused by the first control signal from the toggling caused by the second control signal; and the temporal delay is based on a resonance time of the primary bridge to cause destructive resonance of a first ripple current generated by toggling the first pair of switches and a second ripple current generated by toggling the second pair of switches.

12. A system, comprising:

first and second pairs of switches coupled to a bridge of a dual active bridge (DAB) converter; and control circuitry coupled to the first and second pairs of switches and configured to:

send a first control signal to toggle the first pair of switches; and send a second control signal to toggle the second pair of switches, wherein:

a temporal delay separates the toggling caused by the first control signal from the toggling caused by the second control signal; and the temporal delay is based on a resonance time for the bridge to cause destructive resonance of a first ripple current generated by toggling the first pair of switches and a second ripple current generated by toggling the second pair of switches.

13. The system of claim 12, further comprising at least two capacitors coupled to the bridge, wherein:

the resonance time for the bridge is based on a capacitance of the at least two capacitors and an inductance between the at least two capacitors; and the temporal delay corresponds to half of the resonance time.

14. The system of claim 12, wherein the control circuitry is further configured to:

send third and fourth control signals to respectively toggle the first and second pairs of switches of the bridge, wherein:

the temporal delay separates the toggling caused by the third control signal from the toggling caused by the fourth control signal;

a duty cycle interval separates the toggling caused by the first and third control signals;

the duty cycle interval separates the toggling caused by the second and fourth control signals; and the duty cycle interval is based on a maximum duty ratio for the first and second pairs of switches of the bridge and a sampling time of the DAB converter.

15. The system of claim 14, wherein the maximum duty ratio is: $0.5*(T_s-T_{res})/T_s$, wherein $T_s$ is the sampling time of the DAB converter and $T_{res}$ is the resonance time for the bridge of the DAB converter.

16. The system of claim 14, wherein the maximum duty ratio is: $0.5*(T_s-n*T_{res})/T_s$, wherein $T_s$ is the sampling time of the DAB converter, $T_{res}$ is the resonance time for the bridge of the DAB converter, and n is an odd scalar of the resonance time.

17. The system of claim 12, wherein the bridge is a primary bridge of the DAB converter, the system further comprises third and fourth pairs of switches coupled to a secondary bridge of the DAB converter, and the temporal delay is a first temporal delay, and wherein the control circuitry is further configured to:

send a fifth control signal to toggle a third pair of switches of the secondary bridge of the DAB converter; and send a sixth control signal to toggle a fourth pair of switches of the secondary bridge, wherein:

a second temporal delay separates the toggling caused by the fifth control signal from the toggling caused by the sixth control signal; and the second temporal delay is based on a resonance time for the secondary bridge.

18. The system of claim 17, wherein the control circuitry is further configured to:

send seventh and eighth control signals to respectively toggle the third and fourth pairs of switches of the secondary bridge, wherein:

the second temporal delay separates the toggling caused by the seventh control signal from the toggling caused by the eighth control signal;

a duty cycle interval separates the toggling caused by the fifth and seventh control signals;

the duty cycle interval separates the toggling caused by the sixth and eighth control signals; and the duty cycle interval is based on a maximum duty ratio for the third and fourth pairs of switches of the bridge and a sampling time of the DAB converter.

19. The system of claim 18, wherein:

the toggling caused by the first control signal and the toggling caused by the fifth control signal are separated by a phase shift delay.

20. The system of claim 19, wherein:

when a determined duty cycle of a primary side or secondary side of the DAB converter is limited by a maximum duty ratio, the phase shift delay is adjusted based on the maximum duty ratio to modify an output power of the DAB converter.

* * * * *